United States Patent
Krause et al.

(10) Patent No.: US 7,989,031 B2
(45) Date of Patent: Aug. 2, 2011

(54) COMPONENT SURFACE WITH THREE-DIMENSIONAL SURFACE TEXTURE AND METHOD FOR THE CREATION OF A COMPONENT SURFACE WITH THREE-DIMENSIONAL SURFACE TEXTURE

(75) Inventors: Bernd Krause, Frankfurt (DE); Cordula Ulbrich, Großostheim (DE)

(73) Assignee: Linde Material Handling GmbH (DE)

( * ) Notice: Subject to any disclaimer, the term of this patent is extended or adjusted under 35 U.S.C. 154(b) by 739 days.

(21) Appl. No.: 11/607,834

(22) Filed: Dec. 1, 2006

(65) Prior Publication Data

US 2007/0139434 A1     Jun. 21, 2007

(30) Foreign Application Priority Data

Dec. 3, 2005  (DE) .................. 10 2005 057 787

(51) Int. Cl.
 *B05D 1/32*     (2006.01)
(52) U.S. Cl. ..... 427/466; 101/129; 101/126; 106/31.01; 106/14.5
(58) Field of Classification Search .................. 101/129, 101/126; 106/31.01, 14.5; 427/466
 See application file for complete search history.

(56) References Cited

U.S. PATENT DOCUMENTS

| | | | | |
|---|---|---|---|---|
| 4,042,401 A | * | 8/1977 | Newman et al. | 106/14.5 |
| 4,427,732 A | * | 1/1984 | Gray et al. | 428/172 |
| 4,585,815 A | * | 4/1986 | Ono et al. | 524/23 |
| 4,868,232 A | * | 9/1989 | Hartridge et al. | 524/35 |
| 5,225,267 A | * | 7/1993 | Ochi et al. | 428/214 |
| 5,518,803 A | * | 5/1996 | Thomas | 428/195.1 |
| 5,730,052 A | * | 3/1998 | Mather | 38/142 |
| 6,910,414 B2 | * | 6/2005 | Thomas et al. | 101/128.4 |
| 7,291,209 B2 | * | 11/2007 | Gilli | 106/31.01 |
| 2004/0126490 A1 | * | 7/2004 | Aichholzer et al. | 427/248.1 |
| 2004/0188994 A1 | * | 9/2004 | Uematsu et al. | 280/759 |
| 2009/0047477 A1 | * | 2/2009 | Roys et al. | 428/156 |

* cited by examiner

*Primary Examiner* — Bruce H Hess
*Assistant Examiner* — Tamra L Amakwe
(74) *Attorney, Agent, or Firm* — The Webb Law

(57) ABSTRACT

This invention relates to a component surface (side section 1*a*), in particular a vehicle surface, with a three-dimensional surface texture. This invention further relates to a method for the creation of a component surface (side section 1*a*), in particular a vehicle surface, with a three-dimensional surface texture. To keep the effort and expense required for the achievement of a three-dimensional surface texture low, the invention teaches that a film is glued to the component surface (side section 1*a*), which film has been provided prior to the gluing with a plurality of coats of paint, each using the screen printing process, which in their totality form a three-dimensional surface texture.

5 Claims, 2 Drawing Sheets

COMPONENT SURFACE WITH THREE-DIMENSIONAL SURFACE TEXTURE AND METHOD FOR THE CREATION OF A COMPONENT SURFACE WITH THREE-DIMENSIONAL SURFACE TEXTURE

CROSS REFERENCE TO RELATED APPLICATION

This application corresponds to German Application No. 10 2005 057 787.3 filed Dec. 3, 2005, which is herein incorporated by reference in its entirety.

FIELD OF THE INVENTION

This invention relates to a component surface, in particular a vehicle surface, with a three-dimensional surface texture. The invention also relates to a method for the creation of a component surface, in particular a vehicle surface, with a three-dimensional surface texture.

TECHNICAL CONSIDERATIONS

On fork-lift trucks, such as on the 39X series manufactured and sold by the Material Handling Division of Linde Aktiengesellschaft, the cast and painted counterweight is installed immediately next to flat sidepieces that are painted the same color as the vehicle frame, which is otherwise painted a different color. The surface texture of the cast counterweight is naturally relatively rough. This three-dimensional surface texture is altogether desirable for aesthetic and practical reasons, and can be further emphasized by painting the counterweight with texture paint.

So that the observer does not perceive an aesthetically undesirable contrast between the side pieces of the vehicle frame (that are adjacent to the counterweight and are also painted the same color as the counterweight) and the counterweight itself, it is also desirable to achieve a three-dimensional texture of the surface on the sidepieces of the vehicle. In actual practice, the vehicle frame is first painted in its entirety in the specified color (using the dip process), the result of which is a smooth "two-dimensional" surface texture. Following this complete painting, the side pieces in question are repainted with texture paint in the same shade as the counterweight to also give them a three-dimensional surface texture.

For this purpose, the vehicle frame is transported to a second painting station, where it is prepared for the second painting process by masking certain parts of the vehicle frame.

After the painting, the masking is removed again. In other words, the painting process requires a considerable amount of effort.

The prior art indicates that, for design reasons, multi-colored component surfaces can be produced on vehicles by gluing films with different colors onto specified sections of the surface.

An object of this invention is to provide a component surface of the type generally described above but using a method to achieve a three-dimensional surface texture with reduced effort.

SUMMARY OF THE INVENTION

In one aspect of the invention, a film is glued to the component surface. Before the film is glued in place, it is provided with a plurality of coats of paint, that each can be applied using a screen printing process, and together form a three-dimensional surface texture.

Another aspect of the invention is directed to a method that includes applying a plurality of coats of paint one after another using the screen printing process to form a three-dimensional surface texture on a film, and gluing the film to the component surface.

In another aspect of the invention, a film is glued to the component surface, which film has a three-dimensional surface texture that is created by a multiple-coat screen printing process with different screens. As a result of the application of coats of paint using the screen printing process, by means of a suitable design of the screen, raised particles can be created at certain points of the component surface. The raised particles, in their totality, have the optical and tactile appearance of a three-dimensional surface texture, and each comprise layers of printed paint laminated one on top of another. In this case, texture heights of 20 to 200 micrometers, for example, can be achieved with a width of 1 to 3 millimeters.

In another aspect of the invention, the invention teaches that multiple colors can be applied to the surface of the components with little effort. It is also possible, even when the components are the same color, to achieve different surface roughnesses and surface textures in specified areas of the surface, for example to achieve optical effects (e.g., different levels of refraction of light or different levels of gloss on the component). As a result of the three-dimensional surface texture, minor defects in the application of the film, such as creases and air bubbles, are imperceptible. As a result, touchup and repair work (e.g., breaking air bubbles) is unnecessary.

In another aspect of the invention, the creation of a three-dimensional surface texture using the screen printing process has a further advantage over the conventional painting process. The texture paint can be applied using a paint gun by a painter, which is more easily reproducible and results in uniform and consistent quality.

In another advantageous aspect of the invention, the film is tinted and the paint layers each include a transparent thixotropic paint. The three-dimensional texture is accordingly transparent. The color impression is created by the tinted film. Of course, it is also possible to create tinted textures. To achieve this effect, the colored or transparent film can be printed with several layers of colored paint.

In another aspect of the invention, a transparent top coat is applied to the paint coats that have been deposited using the screen printing process, and the three-dimensional surface texture is sealed and protected against environmental factors.

In another advantageous aspect of the invention, the film can be a cast polyvinyl chloride (PVC) film.

In another aspect of the invention, the film can be a self-adhesive film. In that case, it is unnecessary to apply adhesive to the component surface before the application of the film.

The advantages of the invention become particularly apparent when the component surface to which the film has been glued is located immediately next to a surface segment of a component that is cast and/or painted with texture paint.

BRIEF DESCRIPTION OF THE DRAWINGS

Additional advantages and details of the invention are explained in greater detail below with reference to the exemplary embodiment that is illustrated in the accompanying schematic drawings, in which.

DESCRIPTION OF THE PREFERRED EMBODIMENTS

Figure 1:
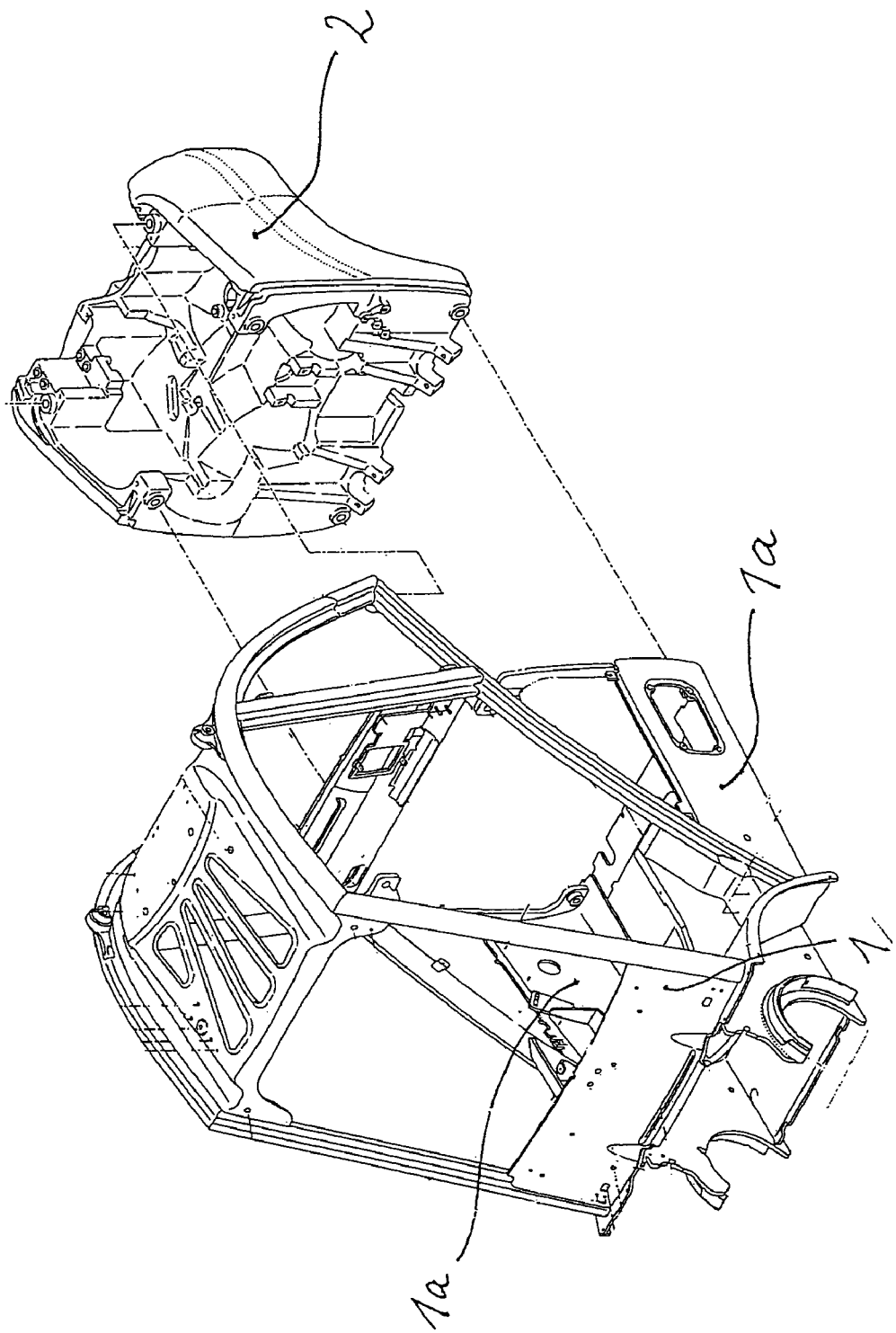
FIG. 1 is a perspective view of a vehicle frame.

FIG. 1 shows a component surface, such as a vehicle frame 1, and the counterweight 2 of a vehicle that is realized in the form of a fork lift truck. The cast counterweight 2 has a relatively rough surface and is also painted with texture paint, for example one that has a red color. The counterweight 2 accordingly has a surface texture which is perceived by the observer optically and by feel as a three-dimensional surface texture. The surface of the vehicle frame 1 is painted black in its entirety using the dipping method, for example, and is therefore smooth, i.e., it has a two-dimensional surface texture.

For aesthetic reasons, it is desirable that the outsides of two flat sidepieces 1a of the vehicle frame 1 have the same color and essentially the same three-dimensional surface texture as the counterweight 2. For this purpose, a self-adhesive film is preferably applied to the outside of the sidepieces 1a, in which the film has previously been printed with a plurality of coats of texture paint, such as thixotropic paint, using a screen printing method with different screens. Using the screen printing process, a three-dimensional surface texture of the film that is made of cast PVC is thereby created.

Figure 4:
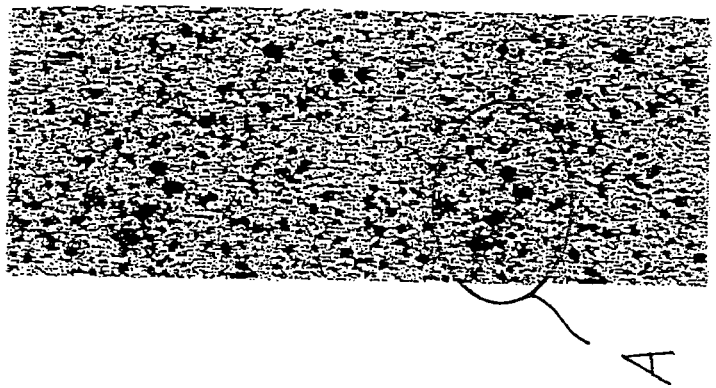
FIG. 4 is an overhead view of an exemplary finished texture.
Figure 3:
FIG. 3 is an overhead view of an exemplary image that can be achieved with a second screen.
Figure 2:
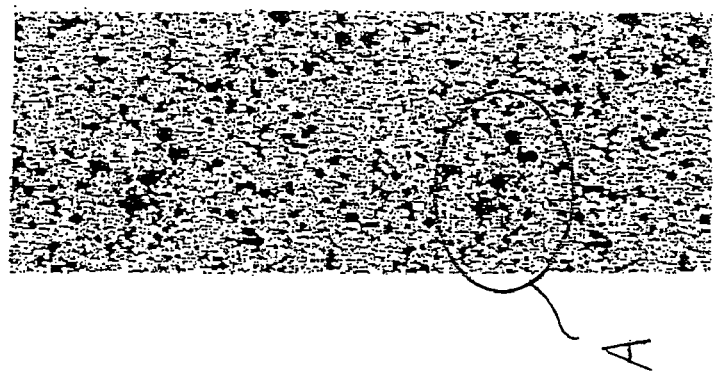
FIG. 2 is an overhead view of an exemplary image that can be achieved with a first screen.

FIGS. 2 to 4 illustrate the principle used in the invention. FIG. 2 shows an overhead view of an image that can be achieved with a screen used at the beginning of the screen printing process and which can be applied to the flatter areas of the surface texture. Then, a second screen is used with which the image illustrated in FIG. 2 can be achieved for the elevated areas of the surface texture. This can be accomplished by the overprinting or overpainting of certain areas. Taken together, the result is a finished, three-dimensional texture as illustrated in the overhead view in FIG. 4. An isolated area of the screen and of the finished surface texture is marked by the circle A in FIGS. 2 to 4.

It goes without saying that the number and type of screens used depends on the desired surface texture and texture height. With regard to the color of the printed film, the printing process can be executed with transparent, thixotropic paint, if the film is tinted in the desired shade. During the printing, of course, consideration must be given to the fact that the color of the finished texture will differ from the color of the unprinted film.

Alternatively, it is also possible to use colored paint for the printing of the film. In both cases, the three-dimensional texture, the texture height of which is determined by the number of coats of paint that partly overlap one another, is sealed at the end of the printing process with a top coat, e.g., a transparent topcoat.

In one embodiment, a component surface to which a film is glued is positioned immediately adjacent a surface segment of a cast component and/or component painted with texture paint as described herein. In another embodiment, the film is glued to the component surface immediately adjacent a surface segment that is cast and/or painted with texture paint.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any all equivalents thereof.

What is claimed is:

1. A method for the creation of a component surface on a fork-lift truck having a cast counterweight and a vehicle frame, with the component surface having a three-dimensional surface texture and being provided on the vehicle frame adjacent to the counterweight, the method comprising the steps of:
    painting a cast counterweight a desired color;
    applying a plurality of coats of paint one after another on a film using a screen printing process to form a three-dimensional surface texture on the film; and
    gluing the film to the component surface such that the counterweight and the component surface each have substantially the same color and three-dimensional surface texture,
    wherein the plurality of coats of paint are applied to the film one on top of another using the screen printing process and each coat of paint is applied with a different screen, which layers in their totality form a three-dimensional surface texture.

2. The method as recited in claim 1, wherein the plurality of coats of paint comprise thixotropic paint.

3. The method as recited in claim 1, wherein the plurality of coats of paint are applied to a tinted film one after another using a screen printing process.

4. The method as recited in claim 1, further comprising applying a transparent top coat to the coats of paint.

5. The method as recited in claim 1, wherein the film is a cast PVC film.

* * * * *